(12) United States Patent
Korte et al.

(10) Patent No.: US 7,886,673 B2
(45) Date of Patent: Feb. 15, 2011

(54) STORAGE DEVICE

(75) Inventors: Hermann Korte, Hauptstrasse 37, Surwold (DE) 26903; Rudolf Schomaker, Segel (DE); Reinhold Trinczek, Grabau (DE)

(73) Assignee: Hermann Korte, Surwold (DE)

( * ) Notice: Subject to any disclaimer, the term of this patent is extended or adjusted under 35 U.S.C. 154(b) by 495 days.

(21) Appl. No.: 11/463,671

(22) Filed: Aug. 10, 2006

(65) Prior Publication Data

US 2007/0044691 A1    Mar. 1, 2007

(30) Foreign Application Priority Data

Aug. 18, 2005  (DE) .................. 20 2005 013 047 U

(51) Int. Cl.
    *A47B 9/00*    (2006.01)
(52) U.S. Cl. .................. 108/110; 108/193; 108/147.15
(58) Field of Classification Search ............ 108/91, 108/92, 106, 110, 147.11, 147.12, 147.13, 108/147.14, 147.15, 147.16, 147.17, 190, 108/192, 193; 211/153, 188, 187, 194, 190, 211/207, 134
    See application file for complete search history.

(56) References Cited

U.S. PATENT DOCUMENTS

| 2,463,124 | A | * | 3/1949 | Sims ..................... 403/334 |
| 2,654,346 | A |   | 10/1953 | Goff |
| 3,086,364 | A |   | 4/1963 | Chapin |
| 3,108,400 | A |   | 10/1963 | Wolfe, Jr. |
| 3,455,054 | A |   | 7/1969 | Camp, Jr. |
| 3,482,785 | A |   | 12/1969 | Chapin et al. |
| 3,606,157 | A |   | 9/1971 | Chapin |
| 3,628,805 | A |   | 12/1971 | Archer et al. |
| 3,664,063 | A |   | 5/1972 | Ware |
| 3,772,827 | A |   | 11/1973 | Ware |
| 3,797,842 | A |   | 3/1974 | Swick, Jr. et al. |
| 3,822,672 | A |   | 7/1974 | Janson et al. |
| 3,851,601 | A | * | 12/1974 | Davis ..................... 108/192 |
| 3,861,327 | A | * | 1/1975 | Silson ..................... 108/91 |
| 4,023,505 | A | * | 5/1977 | Fleck ..................... 108/110 |
| 4,073,241 | A | * | 2/1978 | Wheeler .................. 108/91 |
| 4,158,336 | A | * | 6/1979 | Brescia et al. ........... 108/190 |
| 4,163,342 | A |   | 8/1979 | Fogg et al. |
| 4,250,666 | A |   | 2/1981 | Rakestraw |
| 4,276,720 | A | * | 7/1981 | Lyon ..................... 47/39 |
| 4,467,927 | A | * | 8/1984 | Nathan ..................... 108/91 |

(Continued)

FOREIGN PATENT DOCUMENTS

DE    2204583    8/1973

(Continued)

OTHER PUBLICATIONS

French Patent FR 2805965 to Mieulet, Sep. 14, 2001, English Translation, 30 pages.

*Primary Examiner*—José V Chen
(74) *Attorney, Agent, or Firm*—Fulbright & Joworski L.L.P.

(57) ABSTRACT

A storage device has a rectangular base member which includes a substantially flat floor and four sockets arranged perpendicularly thereto with a free internal cross-section, in each of which is releasably received a supporting rod in the form of a hollow profile. The external cross-section, which corresponds to the internal cross-section of the sockets, is for holding storage platforms. Each of the sockets is configured to include first and second centering structures.

10 Claims, 11 Drawing Sheets

U.S. PATENT DOCUMENTS

| | | | |
|---|---|---|---|
| 4,571,883 A | | 2/1986 | Shaw |
| 4,763,796 A | * | 8/1988 | Flum ........................... 108/91 |
| 5,048,462 A | | 9/1991 | Hostetler |
| 5,218,914 A | * | 6/1993 | Dickinson .................... 108/192 |
| D338,792 S | * | 8/1993 | Chap et al. ................... D6/511 |
| 5,355,618 A | | 10/1994 | Pedersen et al. |
| 5,400,719 A | * | 3/1995 | Santapa et al. ................ 108/91 |
| 5,411,153 A | * | 5/1995 | Unfried ....................... 108/193 |
| D380,762 S | * | 7/1997 | Sammut ....................... D6/511 |
| 5,673,511 A | | 10/1997 | Holtkamp, Jr. |
| 5,695,081 A | * | 12/1997 | Alkalay ....................... 108/192 |
| 5,826,375 A | | 10/1998 | Black |
| 5,956,893 A | | 9/1999 | Harrison |
| 5,960,827 A | | 10/1999 | Rosenberg et al. |
| 5,987,812 A | | 11/1999 | Knell |
| 6,155,435 A | * | 12/2000 | Malik ........................... 108/91 |
| 6,243,985 B1 | | 6/2001 | Miller |
| 6,470,625 B1 | | 10/2002 | Byun et al. |
| 6,695,231 B2 | | 2/2004 | Dramm et al. |
| 6,820,757 B2 | | 11/2004 | Craft et al. |
| 6,843,022 B1 | | 1/2005 | Holley |
| 6,948,435 B1 | * | 9/2005 | Sheng ......................... 108/192 |
| 6,957,627 B1 | | 10/2005 | Knippelmeir |
| 2002/0029517 A1 | | 3/2002 | Hutchinson et al. |
| 2002/0152677 A1 | | 10/2002 | Park |
| 2002/0189163 A1 | | 12/2002 | Cooper |
| 2004/0035813 A1 | | 2/2004 | Sparkowski |
| 2005/0039390 A1 | | 2/2005 | Sharples et al. |
| 2005/0055877 A1 | | 3/2005 | Schomaker et al. |
| 2005/0081438 A1 | | 4/2005 | Schomaker et al. |

FOREIGN PATENT DOCUMENTS

| | | |
|---|---|---|
| DE | 2800575 | 7/1978 |
| DE | 3619262 | 12/1987 |
| DE | 10003837 | 10/2000 |
| EP | 0409031 | 1/1991 |
| EP | 0614794 | 9/1994 |
| FR | 2297557 | 8/1976 |
| FR | 2805965 | 9/2001 |
| GB | 1569405 | 6/1980 |

\* cited by examiner

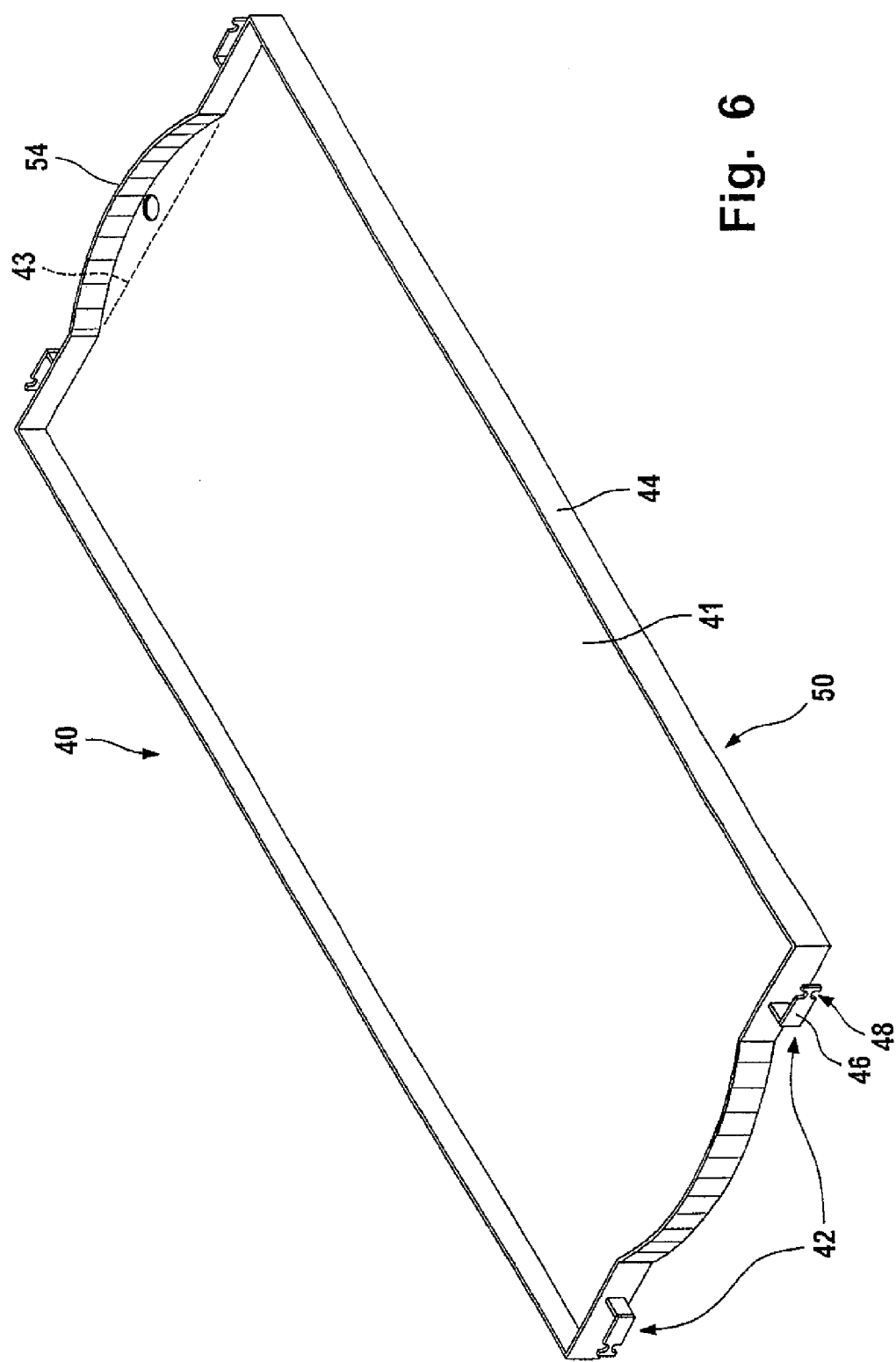

STORAGE DEVICE

CROSS-REFERENCE TO RELATED APPLICATIONS

Not applicable.

TECHNICAL FIELD

The invention relates to a storage device with a rectangular base member which includes a substantially flat floor and four sockets arranged perpendicularly thereto with a free internal cross-section, in each of which is releasably received a supporting rod in the form of a hollow profile, the external cross-section of which corresponds to the internal cross-section of the sockets, for holding storage platforms.

BACKGROUND OF THE INVENTION

A storage device of this kind, which is suitable in particular for storing, watering and transporting plants, is known from, for example, DE 20 213 719.8. Storage devices of this kind include substantially three different components, namely a base member, four supporting rods and a number of storage platforms, which are each mounted on the supporting rods at vertical distances which can be defined.

Storage devices of this kind have proven very useful in practice, but they take up a relatively large amount of space during transport or storage in an empty, unladen state compared to their own weight, so that there is a desire to be able to store or transport a larger number of storage devices in a space-saving manner.

The problem of the present invention consists in improving a storage device of the generic kind in such a way that the problem described above is solved.

BRIEF SUMMARY OF THE INVENTION

The solution according to the invention consists in the fact that, in the region of a lower end of at least one socket, a first centering means is formed in order to co-operate in a centering manner with an upper end of a socket of a further base member, and that a second centering means is provided in order for the lower end of at least one socket to co-operate with an upper end of a supporting rod of a further storage device.

It can be provided that the second centering means is formed in the region of the lower end of the socket.

The centering means have the function of ensuring co-operation between storage devices to prevent displacement in the horizontal direction, so that two or more storage devices can be placed one on top of the other with a fork lift truck, for example, or a number of base members can be stacked one on top of the other; co-operation to prevent displacement in the horizontal direction is achieved by having corresponding parts engage in a positive fit. A centering means of this kind for the purposes of the invention need not inevitably involve a precise fit between two engaging parts, but instead a certain play may certainly be present, as long as it is ensured that two vertically adjacent storage devices or base members cannot be displaced horizontally relative to one another to an unlimited extent without first raising them apart from one another by a predetermined minimum distance in the vertical direction.

It is preferably provided that the sockets have a square internal cross-section.

The supporting rods may have an L, U or C-shaped cross-section.

In a preferred embodiment, the invention contemplates that the first centering means should be formed by a first centering shoulder, which is mounted at the lower end of the socket and projects therefrom, the external cross-section of which corresponds to the internal cross-section of the socket.

In a different embodiment, it can be provided that the first centering means is formed by a centering socket, which is mounted at the lower end of the socket and projects therefrom, the internal cross-section of which corresponds to an external cross-section of the socket.

It can be provided that the second centering means is formed by a second centering shoulder, which is mounted on the first centering shoulder and projects therefrom, the external cross-section of which corresponds to an internal cross-section of the supporting rods.

In a further embodiment, it can be provided that the second centering means is formed by a centering shoulder, which is mounted at the lower end of the socket and projects therefrom, the external cross-section of which corresponds to an internal cross-section of the supporting rods.

In a further modification, it can be provided that the second centering means is formed by a centering shoulder, which is mounted at one end of each supporting rod and projects therefrom, the external cross-section of which corresponds to an internal cross-section of the supporting rods.

In a further modification, the invention provides that the second centering means is formed by a lower end portion of the socket and a stop fixed therein, which may be spaced apart from a lower end of the socket.

In addition, it can be provided that second centering means are formed by a centering socket fixed to one end of a supporting rod, the internal cross-section of which corresponds to the external cross-section of the first centering shoulder.

The invention conveniently provides that the centering shoulders and/or stops are formed by hollow profile sections.

The base member can be designed in the form of a tray and may include a peripheral closed side wall and at least one overflow.

It is preferably contemplated that the base member is provided with rollers on the underside, for example with two fixed and two steering rollers, or with four steering rollers.

The sockets each preferably have at least one cut-out running in their longitudinal direction and terminating open at their upper end.

It is appropriate for the supporting rods to be provided with spaced insertion recesses for hanging storage platforms in.

Each storage platform preferably has four mounting members for inserting in the supporting rods.

The invention further relates to a base member for a storage device in accordance with the invention, with a substantially flat floor and four sockets arranged perpendicularly thereto, with a free internal cross-section, in each of which is releasably received a supporting rod in the form of a hollow profile, the external cross-section of which corresponds to the free internal cross-section, for holding storage platforms, which is characterised by the fact that, in the region of a lower end of at least one socket, a first centering means is formed in order to co-operate in a centering manner with an upper end of a socket of a further base member, and that a second centering means is provided in order for the lower end of at least one socket to co-operate with an upper end of a supporting rod of a further storage device.

In this case, it can be provided that the second centering means is formed in the region of the lower end of the socket.

In a preferred embodiment, the invention provides that the first centering means is formed by a first centering shoulder, which is mounted at the lower end of the socket and projects therefrom, the external cross-section of which corresponds to the internal cross-section of the socket.

In an alternative embodiment, it is provided that the first centering means is formed by a centering socket, which is mounted at the lower end of the socket and projects therefrom, the internal cross-section of which corresponds to an external cross-section of the socket.

It can be provided that the second centering means is formed by a second centering shoulder, which is mounted on the first centering shoulder and projects therefrom, the external cross-section of which corresponds to an internal cross-section of the supporting rods.

It can further be provided that the second centering means is formed by a centering shoulder, which is mounted at the lower end of the socket and projects therefrom, the external cross-section of which corresponds to the internal cross-section of the supporting rods.

The invention further provides that the second centering means is formed by a lower end portion of the socket and a stop fixed therein, which may be spaced apart from the lower end of the socket.

It is conveniently provided that the centering shoulders and/or stops are formed by hollow profile sections.

The base member can be designed in the form of a tray and may include a peripheral closed side wall and at least one overflow.

The base member is preferably provided with rollers on the underside, for example with two fixed and two steering rollers, or with four steering rollers.

It is also appropriate for the sockets each to have at least one cut-out running in their longitudinal direction and ending open at their upper end

BRIEF DESCRIPTION OF THE DRAWINGS

Other advantages and features of the invention will become apparent from the following description of various embodiments, reference being made to a drawing, in which

FIG. 6 shows a perspective representation of a storage platform of the storage device of FIG. 1;

DETAILED DESCRIPTION OF THE INVENTION

Figure 1:
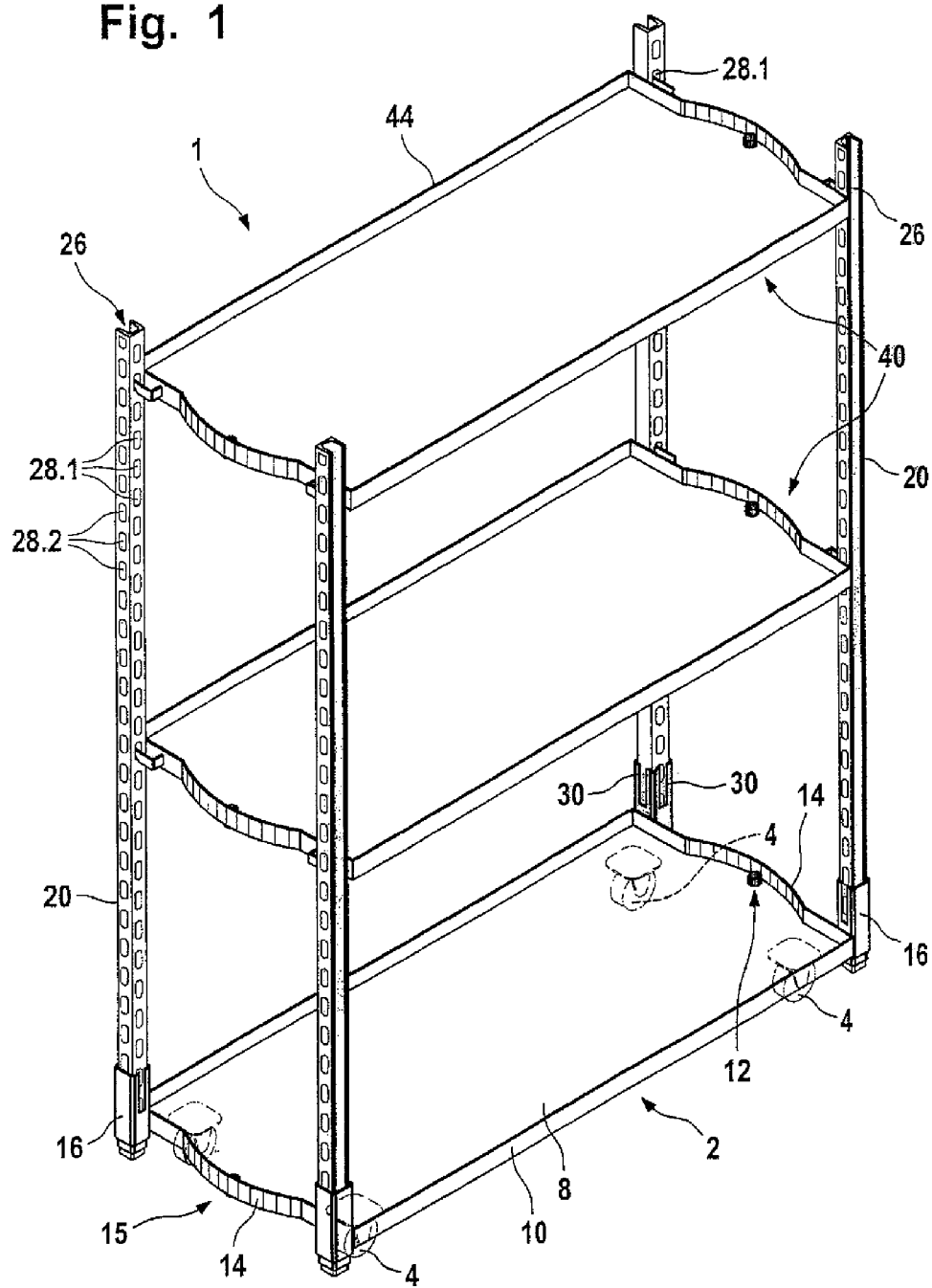
FIG. 1 shows a schematic perspective view of a storage device in accordance with the invention.
Figure 2:
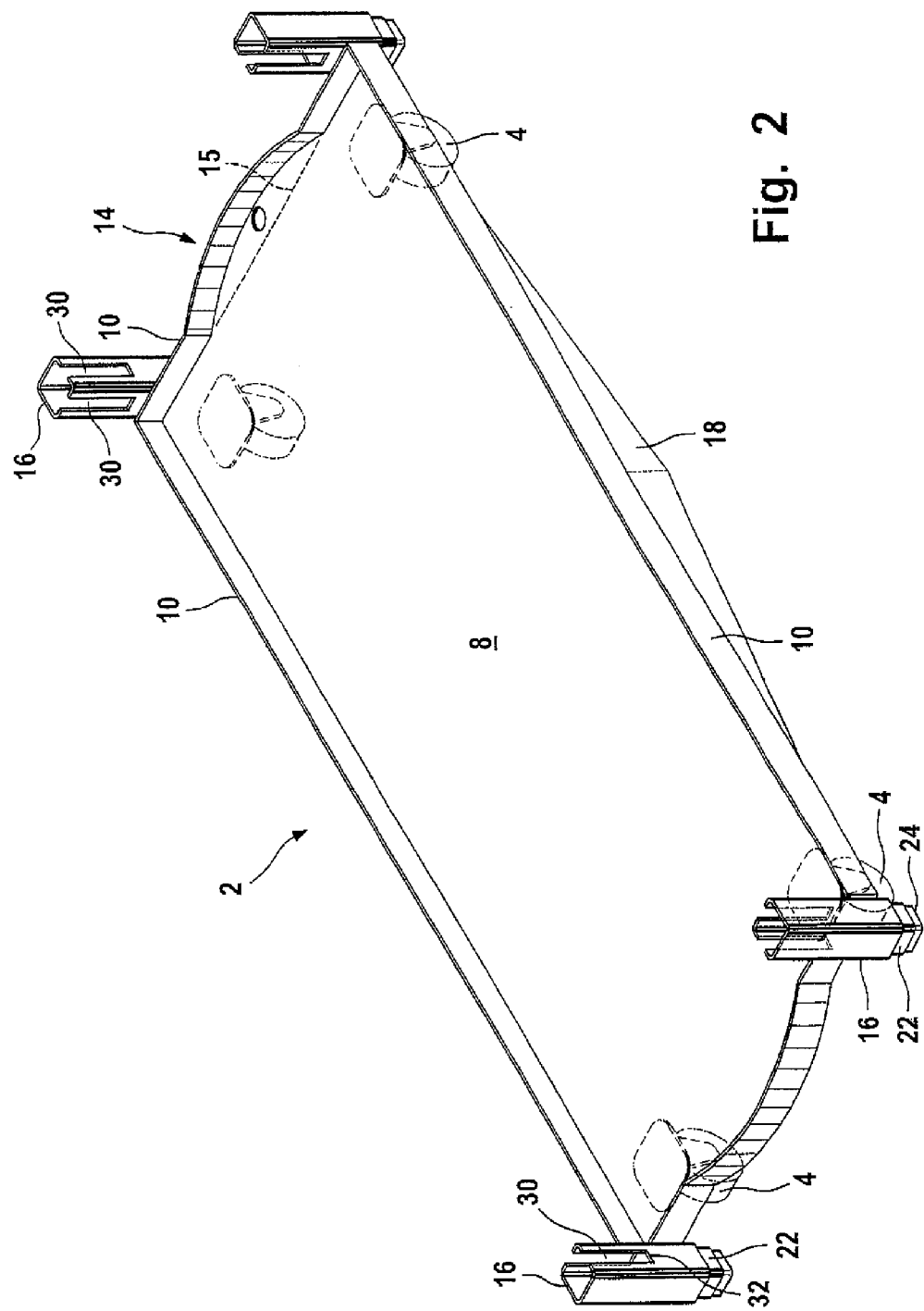
FIG. 2 shows a perspective view of a base platform of the storage device of FIG. 1.

FIG. 1 shows a perspective view of a storage device 1 in accordance with the invention, with a substantially rectangular base member or base platform 2, which is provided with rollers 4 on the underside, for example with two castering and two fixed or with four castering rollers, at least one of which can be equipped with a brake. The base platform 2 has a substantially flat, horizontal floor 8, which can serve as a standing surface, e.g. for plant pots, the base platform being designed in the form of a tray and including a peripheral closed side wall 10 a few centimetres high, for example. An overflow 12 is disposed in each of two mutually opposing edge portions of the narrow sides; the overflow is height-adjustable so that the height of a level of liquid on the floor 8 can be adjusted. The overflows 12 are in each case disposed in the area of a protrusion 14 from the otherwise rectangular floor 8, so that a rectangular standing surface is left, in which no overflows are disposed, as is indicated with the narrow side 15 in FIG. 2. The protrusions 14 may be of any appropriate shape, such as rectangular, polygonal, in the form of a sector of a circle or freely shaped.

In each of the four corner regions of the base platform 2 there is a socket 16 which is square in cross-section (FIGS. 3, 4), the purpose of which is to releasably receive a supporting rod 20. Each socket 16 has a stop 22 at its lower end, which in this case is a square bushing with a smaller cross-section. The height and positioning of the stop 22 determine the depth to which the supporting rod 20 can be inserted into the socket 16. In a first embodiment in accordance with FIGS. 1 to 4 and 8, the stops 22 can protrude downwards from the sockets 16 and make it possible to stack several base platforms 2 on top of one another in a centered manner, as will be explained in detail with reference to FIG. 8. Abutting the stop 22, which also acts as a first centering means, is a second centering member 24 acting as a second centering means, the external cross-section of which corresponds to the internal cross-section of the supporting rods 20, which are in the form of a hollow profile, as will likewise be explained below.

Each socket 16 is provided, in each of two adjacent end portions of the upper end region with a cut-out 30 running perpendicularly, which terminates open at the top.

The floor 8 of the base platform 2 is provided with a reinforcement 18 on its longitudinal sides beneath the side wall 10 in order to increase its load-bearing capacity.

A series of storage platforms 40 are releasably mounted on the four supporting rods 20, one such storage platform being illustrated in greater detail in FIG. 6. The storage platform 40 has a substantially flat floor 41 and a side wall 44 enclosing it in the form of a tray. In the region of each of the narrow sides 43, the storage platform has a protrusion 54, which, as in the case of the base platform, serves to hold an overflow (not shown—what is shown is only the opening in the floor 41 to hold it), so that a rectangular standing surface without overflows remains freely available, as is indicated by the narrow sides 43. The protrusion 54 is in the shape of a sector of a circle in this example, but it can also be of any other shape desired.

Each storage platform 40 is equipped with four hook-shaped mounting members 42, which are inserted into the supporting rods 20. In this example, the mounting members 42 are disposed in the corner portions in the region of the narrow sides 43 of the storage platform. Each mounting member 42 has an insertion end portion 46, which ends freely, in this example in the direction of the adjacent longitudinal side 50 of the storage platform in each case. In a different construction, which is not shown here, the insertion end portion terminates parallel to the longitudinal sides 50.

Figure 7:
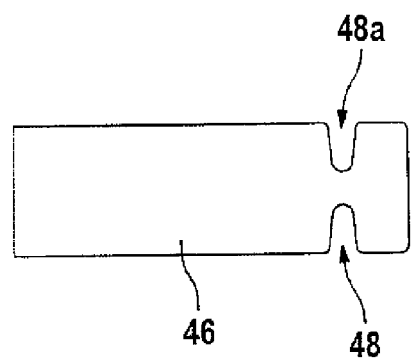
FIG. 7 shows an enlarged representation of an insertion end portion of the storage platform of FIG. 6.

Each insertion end portion 46 is provided with two recesses 48, 48a, which make insertion into a supporting rod 20 possible in a positive fit. FIG. 7 shows an insertion end portion in an enlarged representation. The recess 48a makes it possible to hang the storage platform 40 in upside down (floor 41 facing downwards).

Figure 5:
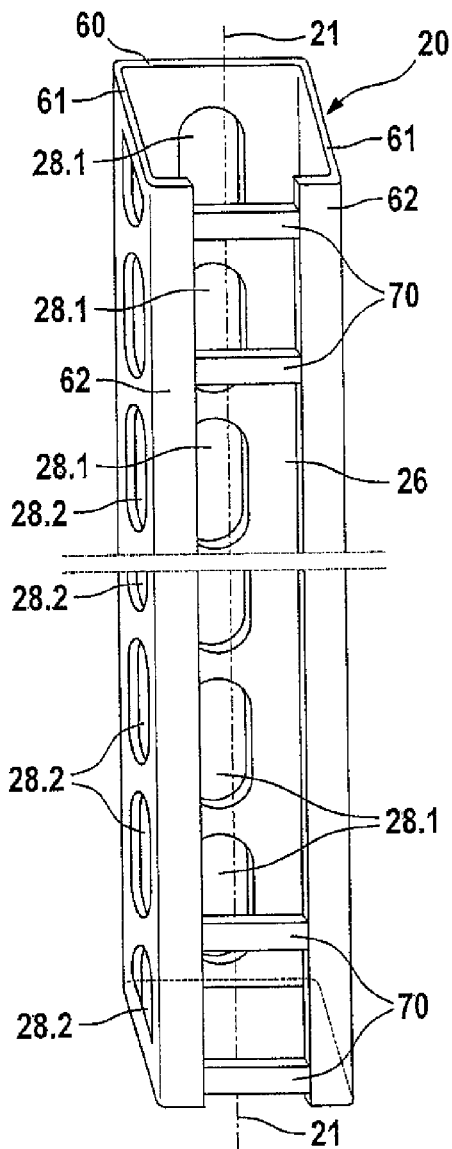
FIG. 5 shows an enlarged partial representation of a supporting rod of the storage device of FIG. 1.

FIG. 5 shows a supporting rod 20 that is formed by a hollow profile which is C-shaped in cross-section and which has a web portion 60, two limb portions 61 extending therefrom, perpendicular thereto and parallel to one another, and two edge portions 62 extending in their turn from the limb portions, and pointing towards one another. At each end of the supporting rod 20, there are two lands 70, which are spaced apart from one another and are in each case disposed between the edge portions 62.

Over the entire length of the supporting rod 20, first insertion recesses 28.1, which are spaced apart from one another, are disposed in the web portion 60, while on the opposite side, a continuous slot 26 is formed between the edge portions 62, which runs the entire length of the supporting rod apart from the lands 70.

Over the entire length of the supporting rod 20, second insertion recesses 28.2, which are spaced apart from one another, are disposed in a limb portion 61, their size, shape and mutual spacing corresponding substantially to the first insertion recesses 28.1. For reasons of strength, however, the first and second insertion recesses are staggered when seen in the longitudinal direction of the supporting rod, i.e. when seen in the longitudinal direction, one first insertion recess 28.1 is disposed between two second insertion recesses 28.2 and vice versa, so that the hollow profile is not weakened excessively.

Relative to a longitudinal axis 21 of the supporting rod 20, the insertion recesses 28.1, 28.2 and the slot 26 are thus disposed turned by 90° and 180° to one another.

If appropriate, insertion recesses can be provided in all three wall portions of the hollow profile, in the web portion 60 and in both limb portions 61, and can be staggered when seen in the longitudinal direction as required and disposed turned by 90° and 180° to one another relative to the longitudinal axis.

Figure 3:
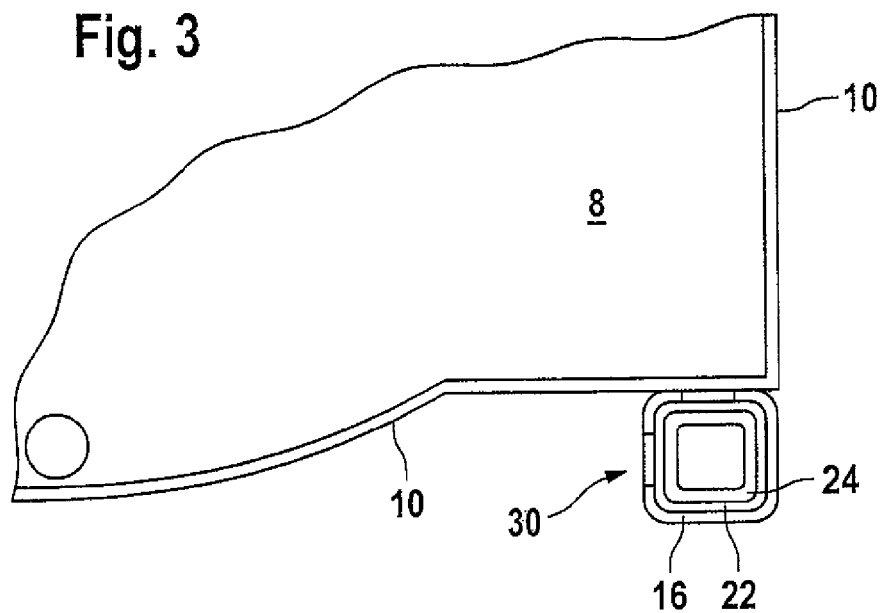
FIG. 3 shows a top plan view of a corner portion of the storage platform of FIG. 2.
Figure 4:
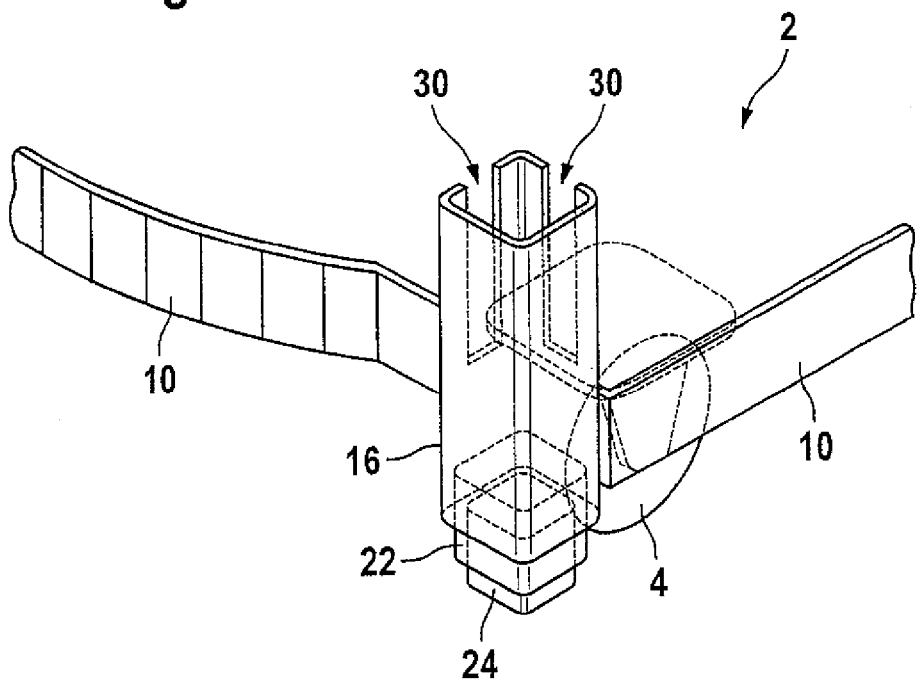
FIG. 4 shows a perspective view of the corner portion of FIG. 3.

The provision of first and second insertion recesses 28.1, 28.2 in two rows turned by 90° to one another, as shown in FIGS. 3 and 4, has the advantage that, in addition to the storage platforms 40 according to FIG. 6, which are shown in FIG. 1, whose insertion end portions 46 terminate transversely to the longitudinal direction of the storage platform, storage platforms whose insertion end portions terminate in the longitudinal direction of the storage platforms can also be hung in one and the same storage device.

In addition, each supporting rod can be provided, approximately in the middle of its length, with a further land (not shown) or with a plurality of lands spread over the length of the supporting rod (with the appropriate number depending on the length of the supporting rod) in the same way as the lands 70.

Figure 8:
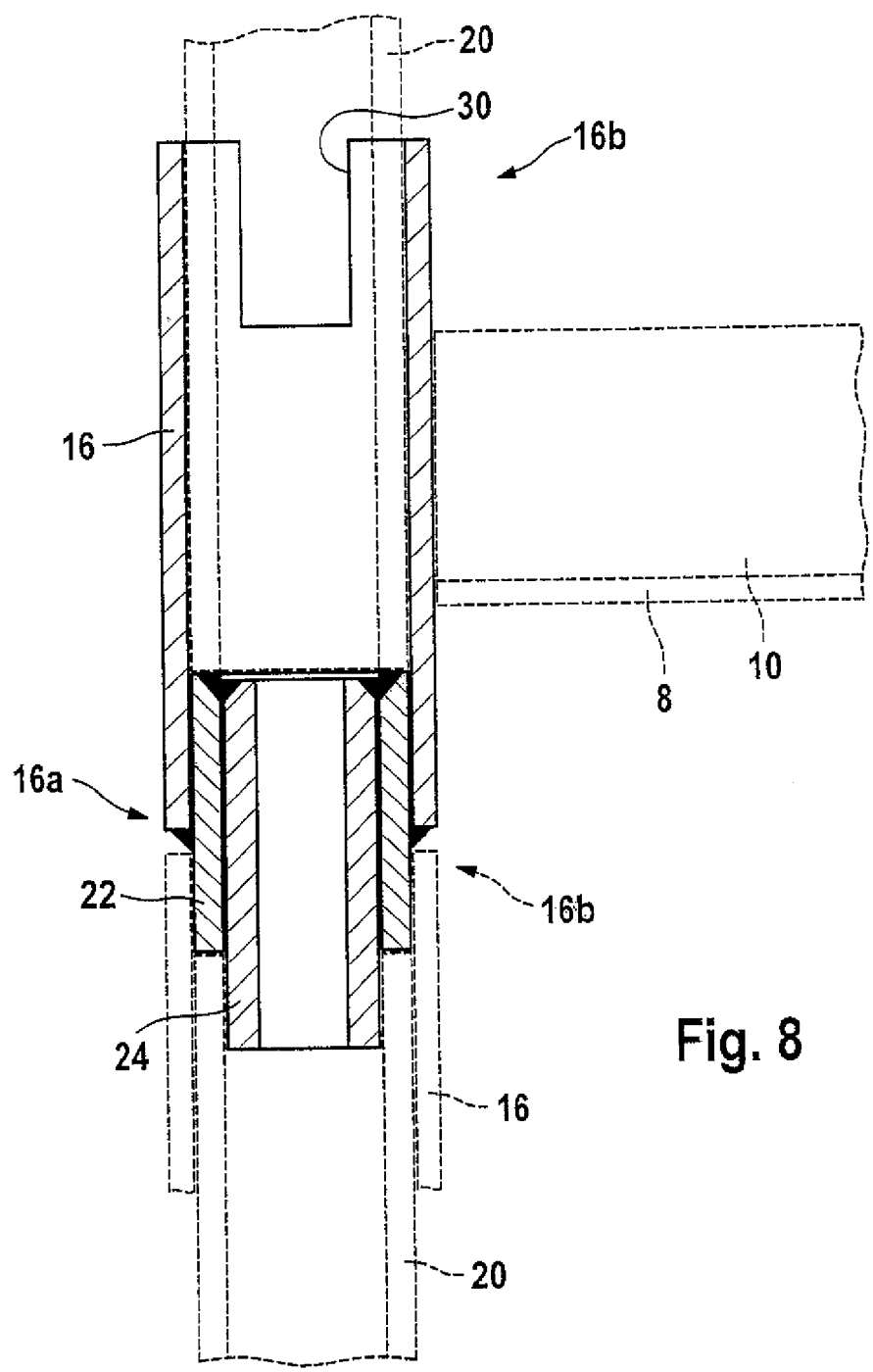
FIG. 8 shows a section view of a corner portion of a base platform according to FIGS. 3 and 4.

Referring next to FIG. 8, the first embodiment of the invention according to FIGS. 1 to 4 will now be explained in more detail. FIG. 8 shows a vertical section view through a socket 16 of a base platform 2, the floor 8 and side wall 10 of which are only hinted at in FIG. 8.

The socket 16, which in this example has a square internal and external cross-section, is provided with a stop 22 at its lower end 16a, the stop also acting as a first centering means for the purposes of the invention and being formed in this example as a socket member with a square internal and external cross-section and being welded to the lower end 16a of the socket 16. Alternatively, immediately next to the lower end 16a of the socket 16, it would be possible to fix a centering member with an external cross-section that corresponded to the internal cross-section of the socket 16, and which could otherwise be solid or have any internal cross-section desired.

A second centering means 24 is fixed to the stop 22; in this example, it is a socket member with a square internal and external cross-section, and the external cross-section of the second centering means 24 corresponds to the internal cross-section of the supporting rods 20 and, in this example, also to the internal cross-section of the first centering means 22.

Figure 13:
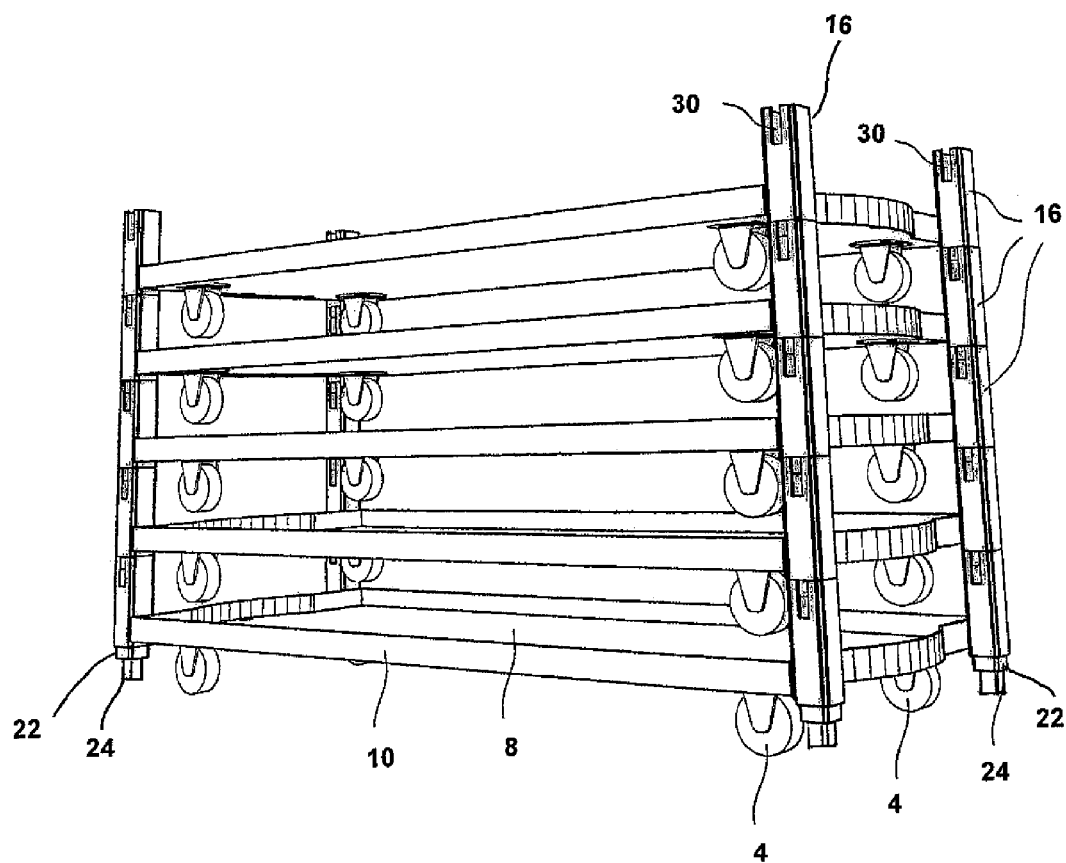

The first centering means 22 makes it possible to stack several base platforms 2 directly on top of one another in a centered manner and in a positive fit, with in each case a first centering means 22 of a base platform 2 engaging from above in an upper end 16b of a socket 16 of a base platform 2 disposed beneath it, as is indicated by dashed lines and shown in FIG. 13. In this way, both or the plurality of base platforms 2 are held together in a manner that prevents displacement and can be stored, transported or otherwise moved as a stack. In the same way, the second centering means 24 makes it possible to stack storage devices, with the first centering means engaging in the supporting rods 20, as is likewise indicated by dashed lines.

In the embodiment according to FIG. 8, all that matters are the external cross-sections or the external contours of the centering means 22, 24, which must correspond to the internal cross-sections or internal contours of the socket 16, on the one hand, and of the supporting rods 20 on the other, or must be slightly smaller than the latter so that they can engage easily with one another.

Figure 9:
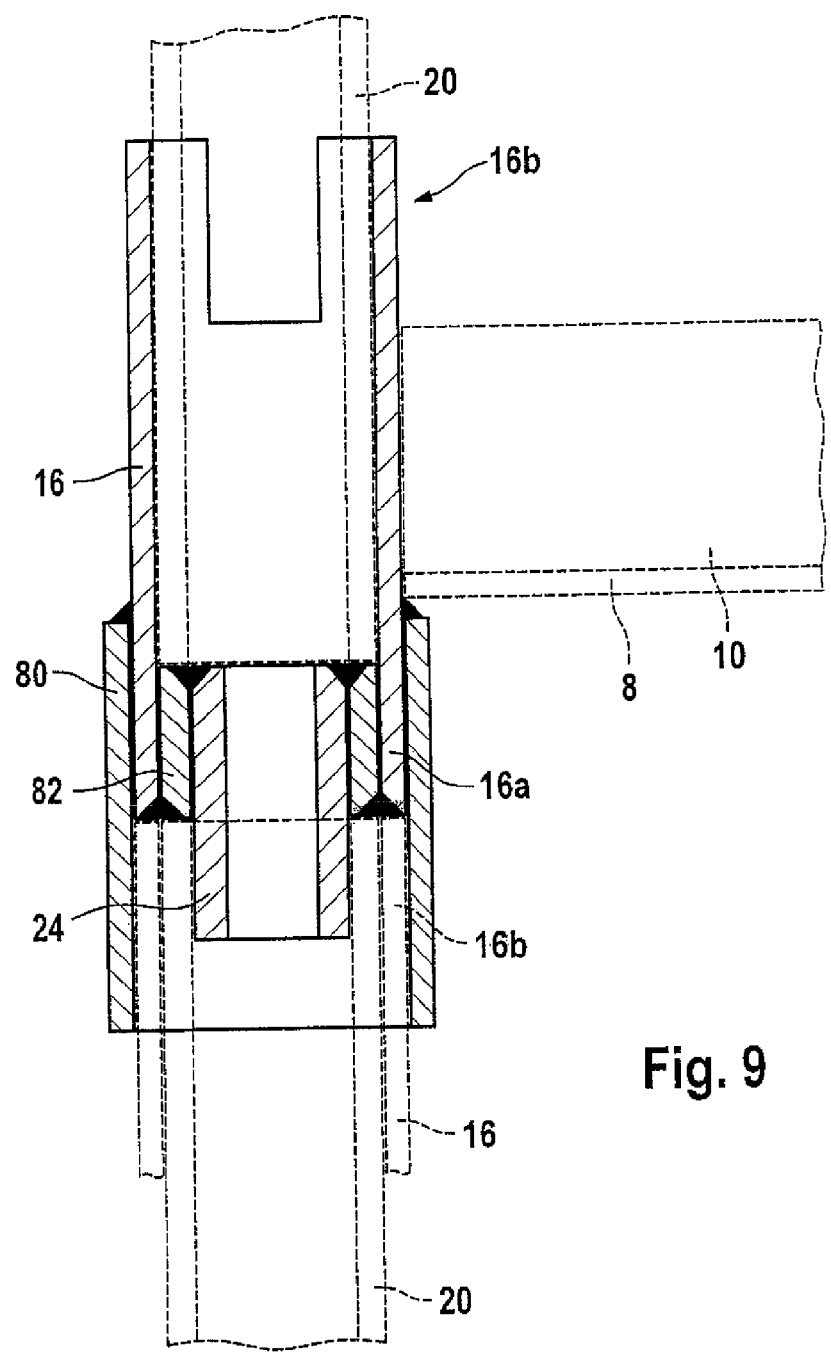
FIG. 9 shows a section view of a corner portion of a variant of the base platform of FIG. 2.

FIG. 9 shows a second embodiment of the present invention, in which a first centering means is formed by a centering socket 80, which is attached to the lower end 16a of the socket 16, such as by being welded to it, and whose free internal cross-section corresponds to the external cross-section of the socket 16. A second centering means 24, which corresponds to that of the first embodiment, is likewise attached to the lower end 16a and projects beyond it, as does the centering socket 80.

When several base platforms 2 are stacked one on top of the other, the centering sockets 80, as the first centering means, extend over the upper ends 16b of the sockets 16 of a lower base platform in each case, whereas, when several storage devices 1 are stacked one on top of the other, the centering means 24 engage in the supporting rods 20 of a lower storage device, as is indicated in FIG. 9 by dashed lines.

Figure 10:
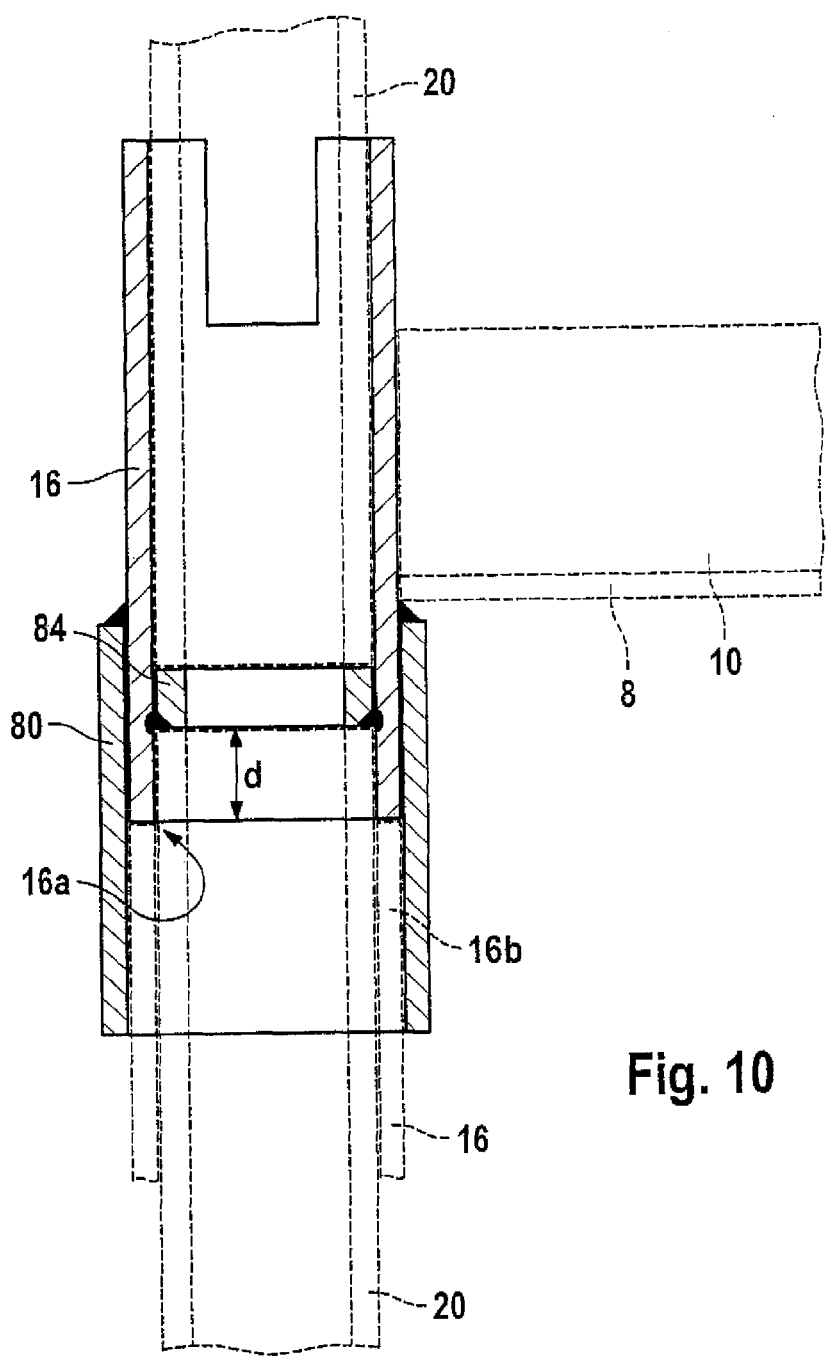
FIG. 10 shows a section view of a corner portion of a further variant of a base platform according to FIG. 2.

FIG. 10 shows a third embodiment of the invention, in which the first centering means is formed, as in FIG. 9, by a centering socket 80, while the second centering means is formed by a lower end portion of the socket 16, in which a stop 84 is fixed, spaced apart by a distance d from the lower end of the socket 16, such as by being welded in.

In this embodiment, the upper ends of the supporting rods 20 are thus received within the sockets 16, to the extent permitted by the stop 84, when one storage device is placed on top of another, while the centering sockets 80 surround the upper ends 16b of the sockets 16 when one base platform is placed on top of another, as is shown in FIG. 10 by dashed lines.

Figure 11:
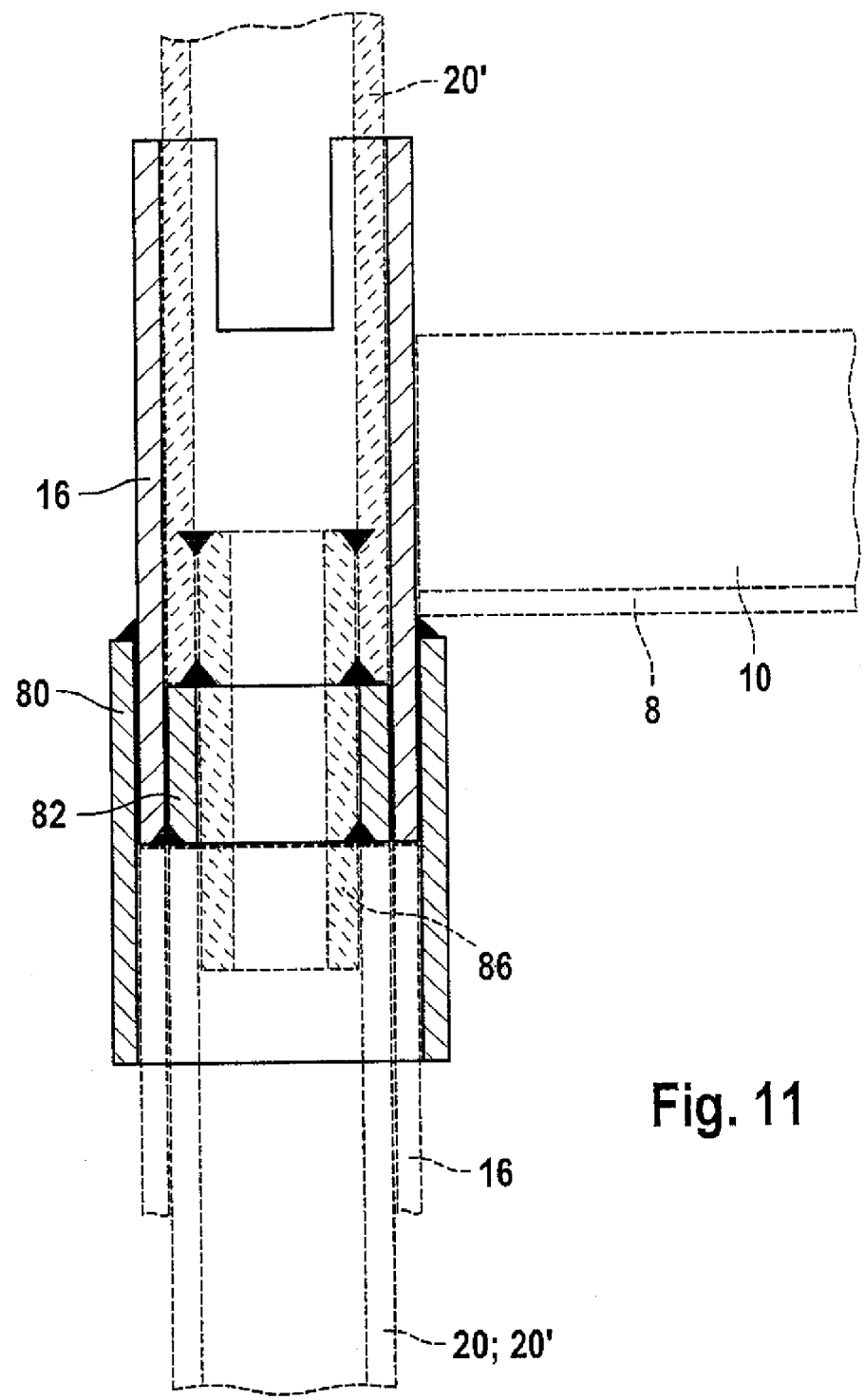
FIG. 11 shows a section view of a corner portion of a further variant of a base platform according to FIG. 2.

FIG. 11 shows a further exemplary embodiment, in which the first centering means is formed by a centering socket 80 as in the previous embodiments, while only one stop 82 is provided inside the socket 16, which can either terminate flush with the lower end of the socket 16, as is shown in FIGS. 9 and 11, or, as is shown in FIG. 10, could be disposed in a retracted position.

The second centering means is formed here, differently from the embodiments explained so far, by a centering shoulder 86, which is firmly joined to one end of a supporting rod 20', such as by being welded to it The external cross-section of the centering shoulder 86 is substantially identical to the internal cross-section of the supporting rod 20', which ensures that when two storage devices are stacked one on top of the other, they can be inserted in a positive fit, as is shown by dashed lines in FIG. 11 (lower supporting rod 20 or 20').

In a variant of the embodiment shown in FIG. 11, the centering shoulders 86 could be omitted, even if the stops 82 terminate flush with the lower ends of the sockets 16, since in such a case the greater part of the centering effect of the centering shoulders 86 is taken over by the centering sockets 80 and only a minor degree of lateral play (transversely to the longitudinal direction of the supporting rods 20') results. In a base platform measuring at least 0.5 m×1.0 m, this kind of play of only a matter of millimetres (corresponding to the wall thickness of the socket 16) does not play any role in practice.

Figure 12:
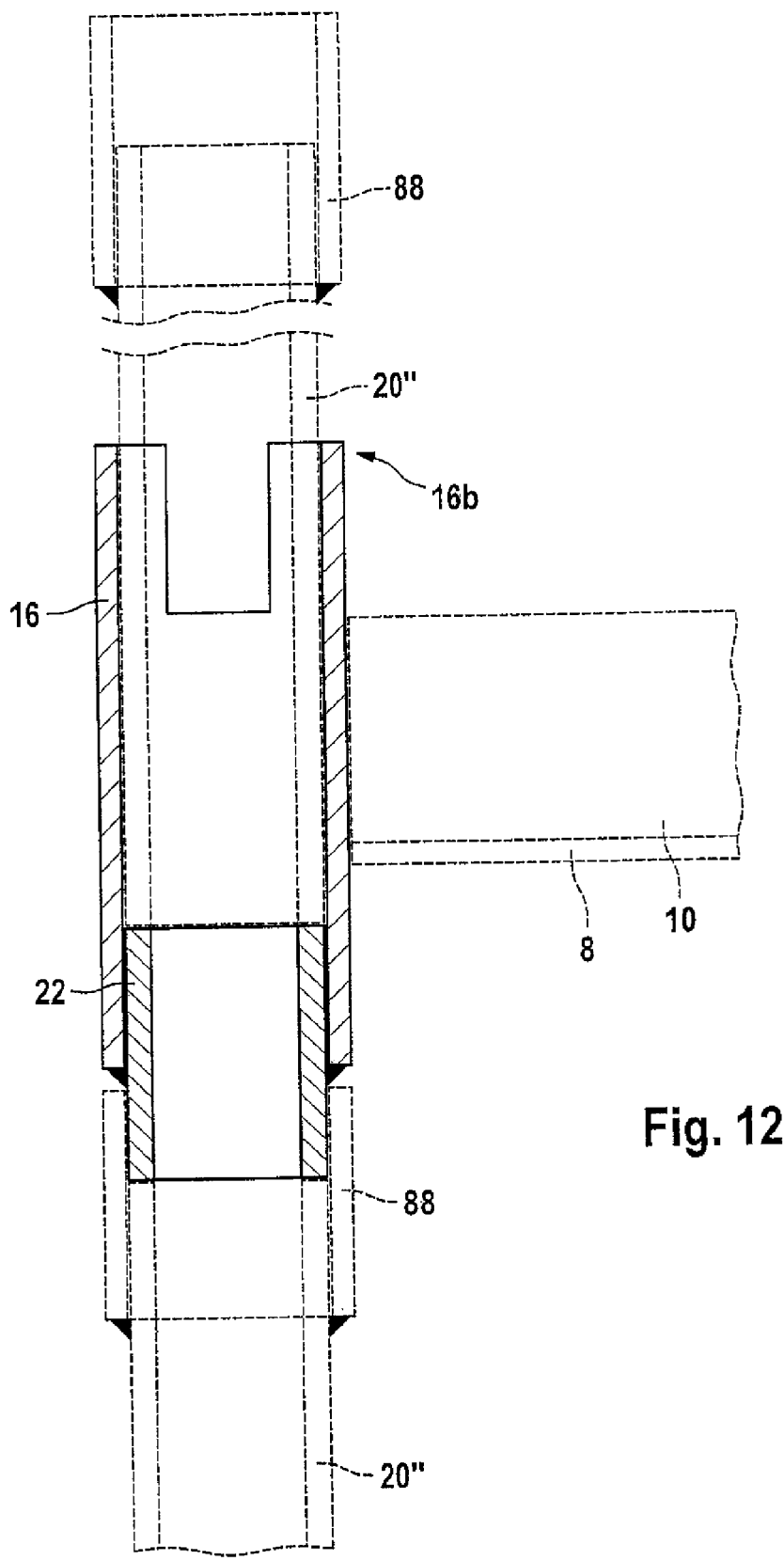
FIG. 12 shows a section view of a corner portion of a further variant of a base platform according to FIG. 2; and, FIG. 13 shows a perspective view of a plurality of stacked base platforms.

FIG. 12 shows yet another embodiment of the invention, in which the first centering means 22 is formed like the first embodiment, which is shown in FIG. 8. The second centering means is formed by a centering socket 88, which is fixed to one end of a supporting rod 20", such as by being welded. The internal cross-section of the centering socket 88 corresponds to the external cross-section of the centering member 22 and conveniently also to the external cross-section of the supporting rod 20", while the external cross-section of the centering member 22, as in the first embodiment, which is shown in FIG. 8, corresponds to the internal cross-section of the socket 16. In the variants shown in FIGS. 11 and 12, there is the advantageous possibility of designing the supporting rods 20', 20" so as to be divisible, since two or more supporting rods 20', 20" can be plugged together, thus forming a multi-part supporting rod.

What is claimed is:

1. A storage device with a rectangular base member, a plurality of supporting rods and at least one storage platform comprising:
    a base member having a substantially flat floor and a socket arranged perpendicularly in each of four corner regions of the base member, each socket having an open internal cross-section at its upper end and first and second centering means at its lower end, the supporting rod having a hollow profile, wherein the external cross-section of the rod corresponds to the internal cross-section of the upper end of the sockets which allows for the sockets to releasably receive the supporting rods in their upper ends, when the rods are placed in each of the sockets in the four corner regions of the base member, the rods support at least one storage platform above the base member;
    the first centering means provided in the lower end of at least one socket extends entirely around an outside surface of the lower end of at least one socket in which the open internal cross-section of the first centering means corresponds to the external cross-section of the socket of another base member, wherein the first centering means encases an upper end of a socket of another base member which provides for the stacking of a plurality of base members directly on top of each other, and
    the second centering means is positioned on an interior portion of the lower end of the socket and projects below the lower end of the socket, wherein the second centering means is inserted into hollow upper end of at least one supporting rod of a storage platform placed below the base member.

2. The storage device as claimed in claim 1, wherein the sockets have a square internal cross-section.

3. The storage device as claimed in claim 1, wherein the external cross-section of the second centering means corresponds to an internal cross-section of the supporting rods.

4. The storage device as claimed in claim 1, wherein the second centering means includes a stop fixed therein positioned between the inner walls of the lower socket end and the outer walls of the second centering means.

5. The storage device as claimed in claim 4, wherein the stop is spaced apart from the upper end of a second socket by a distance (d).

6. A base member and a plurality of supporting rods for a storage device comprising:
    a substantially flat floor with a socket arranged perpendicularly in each of four corner regions of the floor, each socket having an open internal cross-section at its upper end and a first and second centering means at its lower end, the supporting rod having a hollow profile, wherein the external cross-section of the rod corresponds to the open internal cross-section of the socket which allows for the sockets to releasably receive the supporting rods in their upper ends, when the rods are placed in each of the sockets in the four corner regions of the base member, the rods support at least one storage platform above the base member;
    the first centering means provided in the region of the lower end of at least one socket extends entirely around an outside surface of the lower end of at least one socket in which the open internal cross-section of the first centering means corresponds to the external cross-section of the socket of another base member, wherein the first centering means encases an upper end of a socket of another base member which provides for the stacking of a plurality of base members directly on top of each other, and
    the second centering means positioned on an interior portion of the lower end of the socket projects below the lower end of the socket, wherein the second centering means is inserted into a hollow upper end of at least one supporting rod of a storage platform placed below the base member.

7. The base member as claimed in claim 6, wherein the external cross-section of the second centering means corresponds to an internal cross-section of the supporting rods.

8. The base member as claimed in claim 6, wherein the second centering means includes a stop fixed therein positioned between the inner walls of the lower socket end and the outer walls of the second centering means.

9. The base member as claimed in claim 8, wherein the stop is spaced apart from the upper end of a second socket by a distance (d).

10. The base member as claimed in claim 8, wherein the stops are formed by hollow profile sections.

* * * * *